United States Patent
Yu

(10) Patent No.: US 8,787,457 B2
(45) Date of Patent: Jul. 22, 2014

(54) METHODS AND APPARATUS FOR USING SYNTAX FOR THE CODED_BLOCK_FLAG SYNTAX ELEMENT AND THE CODE_BLOCK_PATTERN SYNTAX ELEMENT FOR THE CAVLC 4:4:4 INTRA, HIGH 4:4:4 INTRA, AND HIGH 4:4:4 PREDICTIVE PROFILES IN MPEG-4 AVC HIGH LEVEL CODING

(75) Inventor: Haoping Yu, Carmel, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 685 days.

(21) Appl. No.: 12/448,868

(22) PCT Filed: Jan. 11, 2008

(86) PCT No.: PCT/US2008/000441
§ 371 (c)(1),
(2), (4) Date: Jul. 10, 2009

(87) PCT Pub. No.: WO2008/088768
PCT Pub. Date: Jul. 24, 2008

(65) Prior Publication Data
US 2010/0027624 A1 Feb. 4, 2010

Related U.S. Application Data

(60) Provisional application No. 60/884,576, filed on Jan. 11, 2007.

(51) Int. Cl.
*H04N 7/12* (2006.01)
(52) U.S. Cl.
USPC .................................................. 375/240.12

(58) Field of Classification Search
USPC ....................................................... 375/240.12
See application file for complete search history.

(56) References Cited

U.S. PATENT DOCUMENTS

2007/0206681 A1* 9/2007 Xin et al. ................. 375/240.24

OTHER PUBLICATIONS

"ITU-T Recommendation H.264" published in Mar. 2005.*
Advanced 4:4:4 Profile for MPEG4-Part10/H.264, JVT-P017, Jul. 24-29, 2005 to Yu et al.*
The H.264/AVC Advanced Video Coding Standard: Overview and Introduction to the Fidelity Range Extensions, Gary J. Sullivan et al., Aug. 2004.*
Sullivan et al.: "Draft Text of H.264/AVC Professional Extensions Amendment", Video Standards and Drafts, No. JVT-J047, Dec. 12, 2003, XP030005820.

(Continued)

*Primary Examiner* — Mehrdad Dastouri
*Assistant Examiner* — Mohammed Rahaman
(74) *Attorney, Agent, or Firm* — Robert D. Shedd; Paul P. Kiel; Xiaoan Lu

(57) ABSTRACT

There are provided methods and apparatus for using syntax for the coded_block_flag syntax element for the CAVLC 4:4:4 Intra, High 4:4:4 Intra, and High 4:4:4 Predictive profiles in MPEG-4 AVC high level coding. An apparatus includes an encoder for encoding image data into a resultant bitstream in accordance with an encoding profile that encodes a sample of the image data such that the sample includes two chrominance arrays and a luminance array. Each of the two chrominance arrays has a same height and a same width as the luminance array. The encoder indicates a presence of at least one 8×8 block in the resultant bitstream using a syntax element.

21 Claims, 3 Drawing Sheets

(56) References Cited

OTHER PUBLICATIONS

Sullivan et al.: "New Standardized Extensions of MPEG4-AVC/H.264 for Professinal-Quality Video Applications" Image Processing, 2007, ICIP 2007, IEEE International Conference on, IEEE, PI, Sep. 1, 2007, pp. 1-13-1-16, XP031157666.

Sullivan et al.: "The H.264/AVC Advanced Video Coding Standard: Overview and Introduction to the fidelity range extensions", Proceedings of the SPIE, SPIE, Bellingham, VA. vol. 5558, Nov. 1, 2004, pp. 454-474, XP002340590.

Yu et al.: "Proposed 4:4:4 Draft Changes", Video Standards and Drafts, JVT-U022, Oct. 17, 2006, XP030006668.

Sullivan et al.: "Draft Text of H.264/AVC Fidelity Range Extentions Amendment", Advanced Video Coding, ITU-T Recommendation H.264 ISO/IEC 14496-10, JVT-L041d12, pp. i-82, XP0030005899.

European Search Report dated Jul. 4, 2008.

\* cited by examiner

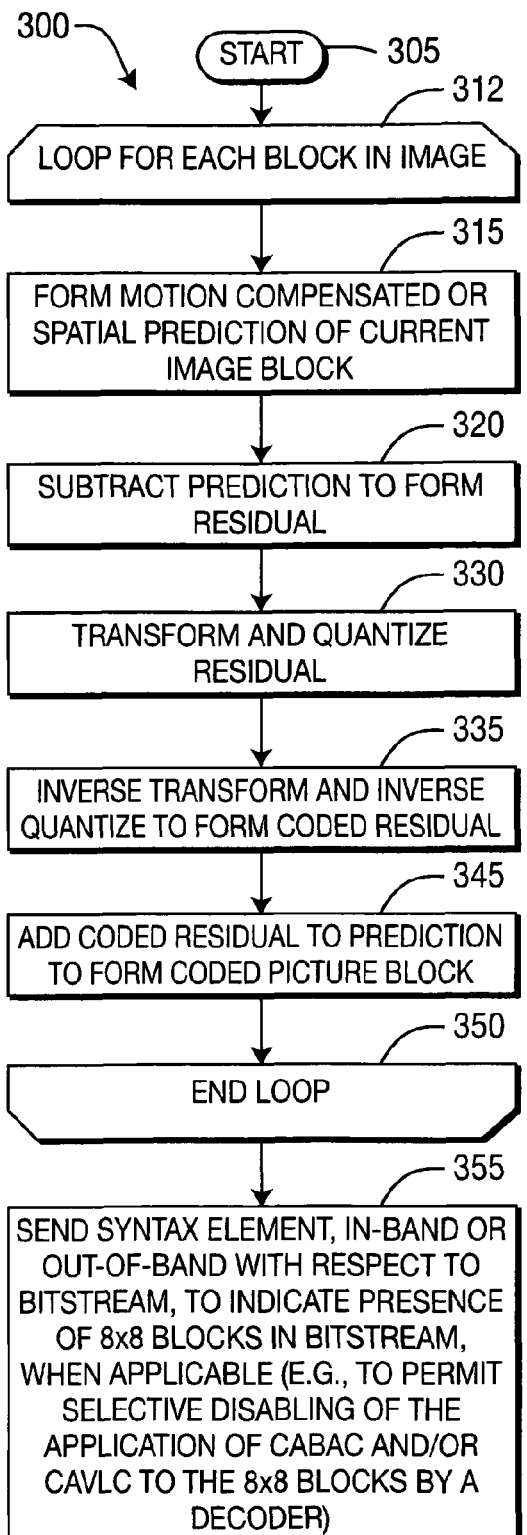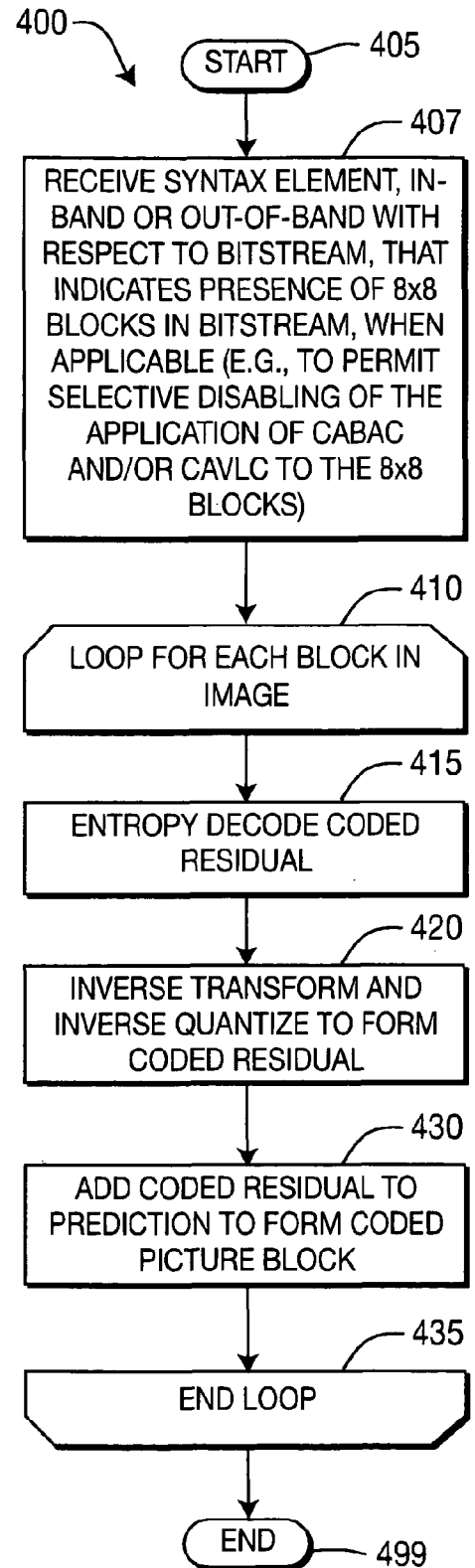
FIG. 3
FIG. 4

METHODS AND APPARATUS FOR USING SYNTAX FOR THE CODED_BLOCK_FLAG SYNTAX ELEMENT AND THE CODE_BLOCK_PATTERN SYNTAX ELEMENT FOR THE CAVLC 4:4:4 INTRA, HIGH 4:4:4 INTRA, AND HIGH 4:4:4 PREDICTIVE PROFILES IN MPEG-4 AVC HIGH LEVEL CODING

CROSS-REFERENCE TO RELATED APPLICATIONS

This application claims the benefit, under 35 U.S.C. §365 of International Application PCT/US2008/00441 and filed Jan. 11, 2008, which was published in accordance with PCT Article 21(2) on Jul. 24, 2008, in English and which claims the benefit of U.S. Provisional Patent Application No. 60/884, 576, filed on Jan. 11, 2007, in English.

TECHNICAL FIELD

The present principles relate generally to video coding and decoding and, more particularly, to methods and apparatus for using a previously unused syntax element for the coded_block_flag syntax element for the HIGH 4:4:4 Intra and HIGH 4:4:4 Predictive profiles in the International Organization for Standardization/international Electrotechnical Commission (ISO/IEC) Moving Picture Experts Group-4 (MPEG-4) Part 10 Advanced Video Coding (AVC) standard/ International Telecommunication Union, Telecommunication Sector (ITU-T) H.264 recommendation (hereinafter the "MPEG-4 AVC standard"). Moreover, the present principles relate to methods and apparatus for improving the efficiency of the CAVLC process for the CAVLC 4:4:4 Intra profile in the MPEG-4 AVC Standard for any block sizes.

BACKGROUND

A description will now be given regarding the coded_block_flag syntax element for image blocks using the 8×8 transform.

In the current design of the CAVLC 4:4:4 Intra, High 4:4:4 Intra, and High 4:4:4 Predictive profiles, a single coded_block_pattern is coded for each macroblock and the 4-bit variable CodedBlockPatternLuma is shared by all three color components when the separate_color_plane_flag syntax element is equal to zero. This works well except for Context Adaptive Binary Arithmetic Coding-coded (CABAC-coded) blocks using the 8×8 transform, that is, with the following parameters set as follows: the transform_size_ 8×8_flag syntax element is equal to one; and the entropy_coding_mode_flag syntax element is equal to one. With the current macroblock layer syntax, residual data syntax, and residual block CABAC syntax proposed for the High 4:4:4 Intra, CAVLC 4:4:4 Intra, and High 4:4:4 Predictive profiles, when the color components are encoded together in a macroblock, the coded_block_flag syntax element is also used if the transform_size_8×8_flag syntax element is equal to one.

With respect to code assignment for the coded_block_pattern syntax element in the 4:4:4 profiles, in particular, with the current semantics of the coded_block_pattern syntax element in the 4:4:4 profiles, only the 4 lower bits of the coded_ block_pattern syntax element are used. Consequently, for the 4:4:4 profiles, part (b) (chrom_format_idc is equal to 0) of Table 9-4, the assignment of the codeNum syntax element to values of the coded_block_pattern syntax element for macroblock prediction modes, should be used.

Thus, the Context Adaptive Binary Arithmetic Coding (CABAC) disadvantageously fails when applied to block sizes of 8×8 in the High 4:4:4 Intra and High 4:4:4 Predictive profiles due to a deficiency of the coded_block_flag syntax element in such situations. Moreover, the Context Adaptive Variable Length Coding (CAVLC) process is inefficient for any block size with respect to the use of the coded_ block_pattern syntax element in the CAVLC 4:4:4 Intra profile.

SUMMARY

These and other drawbacks and disadvantages of the prior art are addressed by the present principles, which are directed to methods and apparatus for using a previously unused syntax element for the coded_block_flag syntax element for the HIGH 4:4:4 Intra and HIGH 4:4:4 Predictive profiles in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard").

Moreover, the present principles are directed to methods and apparatus for improving the efficiency of the CAVLC process for the CAVLC 4:4:4 Intra profile in the MPEG-4 AVC Standard for any block sizes, by using a monochrome chroma array type for the mapping process for the coded_block_pattern syntax element.

According to an aspect of the present principles, there is provided an apparatus. The apparatus includes an encoder for encoding image data into a resultant bitstream in accordance with an encoding profile that encodes a sample of the image data such that the sample includes two chrominance arrays and a luminance array. Each of the two chrominance arrays has a same height and a same width as the luminance array. The encoder indicates a presence of at least one 8×8 block in the resultant bitstream using a syntax element.

According to another aspect of the present principles, there is provided a method. The method includes the step of encoding image data into a resultant bitstream in accordance with an encoding profile that encodes a sample of the image data such that the sample includes two chrominance arrays and a luminance array. Each of the two chrominance arrays has a same height and a same width as the luminance array. The encoding step includes indicating a presence of at least one 8×8 block in the resultant bitstream using a syntax element.

According to yet another aspect of the present principles, there is provided an apparatus. The apparatus includes a decoder for decoding image data from a bitstream previously encoded in accordance with an encoding profile that encodes a sample of the image data such that the sample includes two chrominance arrays and a luminance array. Each of the two chrominance arrays has a same height and a same width as the luminance array. The decoder determines a presence of at least one 8×8 block in the resultant bitstream using a syntax element.

According to still another aspect of the present principles, there is provided a method. The method includes the step of decoding image data from a bitstream previously encoded in accordance with an encoding profile that encodes a sample of the image data such that the sample includes two chrominance arrays and a luminance array. Each of the two chrominance arrays has a same height and a same width as the luminance array. The decoding step includes determining a presence of at least one 8×8 block in the resultant bitstream using a syntax element.

According to a further aspect of the present principles, there is provided an apparatus. The apparatus includes an encoder for encoding image data into a resultant bitstream in accordance with an encoding profile that encodes a sample of the image data such that the sample includes two chrominance arrays and a luminance array. Each of the two chrominance arrays has a same height and a same width as the luminance array. The encoder encodes the image data using Context Adaptive Variable Length Coding (CAVLC) and performs a mapping process for a coded block pattern syntax element using a monochrome chroma array type.

According to a still further aspect of the present principles, there is provided a method. The method includes encoding image data into a resultant bitstream in accordance with an encoding profile that encodes a sample of the image data such that the sample includes two chrominance arrays and a luminance array. Each of the two chrominance arrays has a same height and a same width as the luminance array. The encoding step encodes the image data using Context Adaptive Variable Length Coding (CAVLC) and performs a mapping process for a coded block pattern syntax element using a monochrome chroma array type.

According to a yet still further aspect of the present principles, there is provided an apparatus. The apparatus includes a decoder for decoding image data from a bitstream previously encoded in accordance with an encoding profile that encodes a sample of the image data such that the sample includes two chrominance arrays and a luminance array. Each of the two chrominance arrays has a same height and a same width as the luminance array. The decoder decodes the image data using Context Adaptive Variable Length Coding (CAVLC) and performs a mapping process for a coded block pattern syntax element using a monochrome chroma array type.

According to an additional aspect of the present principles, there is provided a method. The method includes decoding image data from a bitstream previously encoded in accordance with an encoding profile that encodes a sample of the image data such that the sample includes two chrominance arrays and a luminance array. Each of the two chrominance arrays has a same height and a same width as the luminance array. The decoding step decodes the image data using Context Adaptive Variable Length Coding (CAVLC) and performs a mapping process for a coded block pattern syntax element using a monochrome chroma array type.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 3 is a flow diagram illustrating an exemplary video encoding process, in accordance with an embodiment of the present principles; and FIG. 4 is a flow diagram illustrating an exemplary video decoding process, in accordance with an embodiment of the present principles.

DETAILED DESCRIPTION

Figure 1:
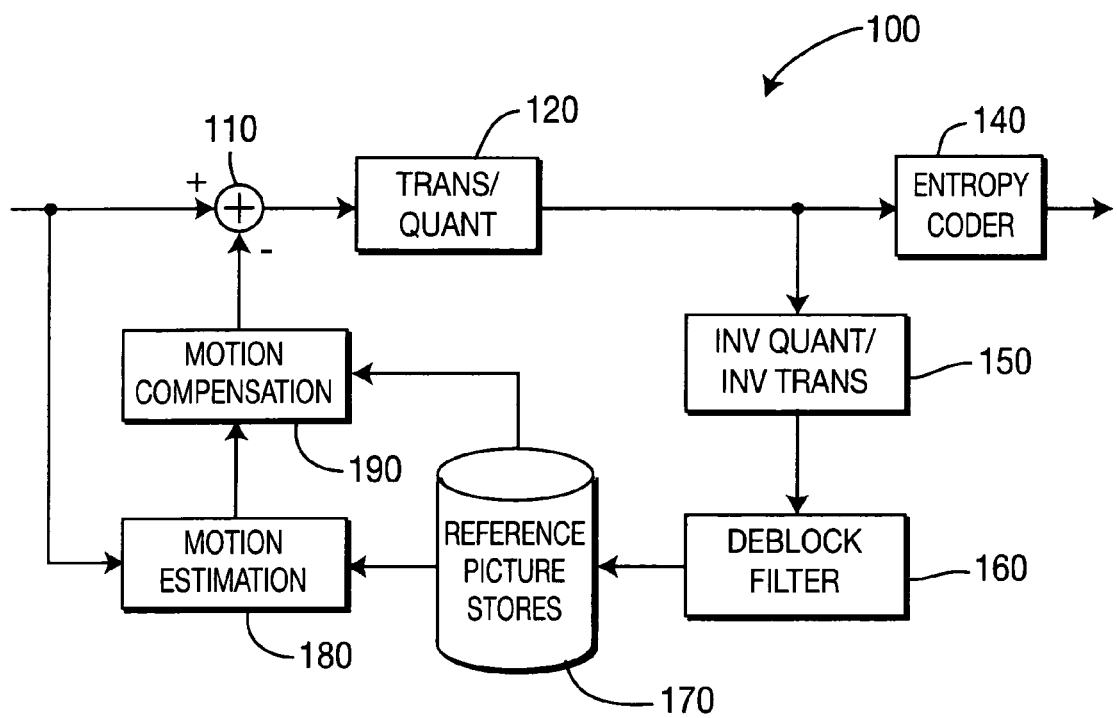
FIG. 1 is a block diagram illustrating an exemplary video encoder to which the present principles may be applied, in accordance with an embodiment of the present principles.

The present principles are directed to methods and apparatus for using a previously unused syntax element for the coded_block_flag syntax element for the HIGH 4:4:4 Intra and HIGH 4:4:4 Predictive profiles in the International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 recommendation (hereinafter the "MPEG-4 AVC standard").

Moreover, the present principles are directed to methods and apparatus for improving the efficiency of the CAVLC process for the CAVLC 4:4:4 Intra profile in the MPEG-4 AVC Standard for any block sizes, by using a monochrome chroma array type for the mapping process for the coded_block_pattern syntax element.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, the phrase "image data" is intended to refer to data corresponding to any of still images and moving images (i.e., a sequence of images including motion).

Moreover, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

Further, as user herein with respect to a syntax element for indicating the presence of one or more 8×8 blocks in a bitstream, the phrase "previously unused" refers to a syntax element that is not used in any current or previous video coding standards and/or recommendations.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that the tables, sections, clauses, sub-clauses, and so forth referred to herein relate to the MPEG-4 AVC Standard.

Further, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Turning to FIG. 1, a video encoder to which the present principles may be applied is indicated generally by the reference numeral 100. An input to the video encoder 100 is connected in signal communication with a non-inverting input of a summing junction 110. The output of the summing junction 110 is connected in signal communication with a transformer/quantizer 120. The output of the transformer/quantizer 120 is connected in signal communication with an entropy coder 140. An output of the entropy coder 140 is available as an output of the encoder 100.

The output of the transformer/quantizer 120 is further connected in signal communication with an inverse transformer/quantizer 150. An output of the inverse transformer/quantizer 150 is connected in signal communication with an input of a deblock filter 160. An output of the deblock filter 160 is connected in signal communication with reference picture stores 170. A first output of the reference picture stores 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture stores 170 is connected in signal communication with a second input of the motion compensator 190. The output of the motion compensator 190 is connected in signal communication with an inverting input of the summing junction 110.

Figure 2:
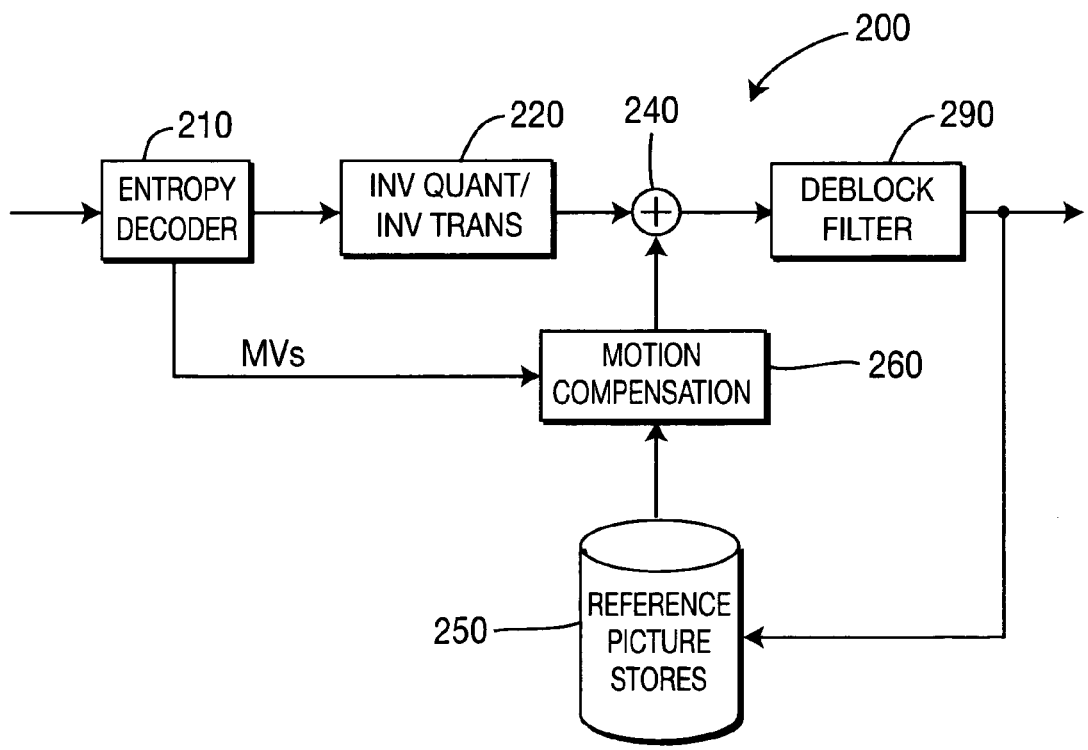
FIG. 2 is a block diagram illustrating an exemplary video decoder to which the present principles may be applied, in accordance with an embodiment of the present principles.

Turning to FIG. 2, a video decoder to which the present principles may be applied is indicated generally by the reference numeral 200. The video decoder 200 includes an entropy decoder 210 for receiving a video sequence. A first output of the entropy decoder 210 is connected in signal communication with an input of an inverse quantizer/transformer 220. An output of the inverse quantizer/transformer 220 is connected in signal communication with a first input of a summing junction 240.

The output of the summing junction 240 is connected in signal communication with a deblock filter 290. An output of the deblock filter 290 is connected in signal communication with reference picture stores 250. The reference picture stores 250 is connected in signal communication with a first input of a motion compensator 260. An output of the motion compensator 260 is connected in signal communication with a second input of the summing junction 240. A second output of the entropy decoder 210 is connected in signal communication with a second input of the motion compensator 260. The output of the deblock filter 290 is available as an output of the video decoder 200.

As noted above, the present principles are directed to a method and apparatus for using a previously unused syntax for the coded_block_flag syntax element for the HIGH 4:4:4 INTRA and HIGH 4:4:4 predictive profiles in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). Advantageously, the present principles overcome at least the above-described problems of the current implementations of the High 4:4:4 Intra and High 4:4:4 Predictive profiles described in the MPEG-4 AVC Standard and amendments thereto.

With respect to code assignment for the coded_block_pattern syntax element in the 4:4:4 profiles, in particular, with the current semantics of the coded_block_pattern syntax element in the 4:4:4 profiles, only the 4 lower bits of the coded_block_pattern syntax element are used. Consequently, for the 4:4:4 profiles, part (b) (chrom_format_idc is equal to 0) of Table 9-4, the assignment of the codeNum syntax element to values of the coded_block_pattern syntax element for macroblock prediction modes, should be used.

Accordingly, in an embodiment, a new mapping process is provided for the coded_block_pattern syntax element, as follows.

Existing Tables 9-4a and 9-4b are modified as follows. It is to be appreciated that while the proposed change relates to CAVLC entropy coding, for the sake of completeness, most of the entire section for the coded_block_pattern syntax element in the CAVLC mode is provided, as follows.

Regarding the mapping process for the coded_block_pattern syntax element, the input to the mapping process if codeNum, as specified in sub-clause 9.1. The output of the mapping process is a value of the syntax element coded_block_pattern coded as me(v). Tables 9-4a and 9-4b show the assignment of coded_block_pattern to codeNum depending on whether the macroblock prediction mode is equal to Intra_4x4, Intra_8x8 or Inter. In particular, Table 9-4a relates to ChromaArrayType equal to 1 or 2, and Table 9-4b relates to ChromaArrayType equal to 0 or 3.

TABLE 9-4a

| | code_block_pattern | |
|---|---|---|
| codeNum | Intra_4x4, Intra_8x8 | Inter |
| 0 | 47 | 0 |
| 1 | 31 | 16 |
| 2 | 15 | 1 |
| 3 | 0 | 2 |
| 4 | 23 | 4 |
| 5 | 27 | 8 |
| 6 | 29 | 32 |
| 7 | 30 | 3 |
| 8 | 7 | 5 |
| 9 | 11 | 10 |
| 10 | 13 | 12 |
| 11 | 14 | 15 |
| 12 | 39 | 47 |
| 13 | 43 | 7 |
| 14 | 45 | 11 |
| 15 | 46 | 13 |
| 16 | 16 | 14 |
| 17 | 3 | 6 |
| 18 | 5 | 9 |
| 19 | 10 | 31 |
| 20 | 12 | 35 |
| 21 | 19 | 37 |
| 22 | 21 | 42 |
| 23 | 26 | 44 |
| 24 | 28 | 33 |
| 25 | 35 | 34 |
| 26 | 37 | 36 |
| 27 | 42 | 40 |
| 28 | 44 | 39 |
| 29 | 1 | 43 |
| 30 | 2 | 45 |
| 31 | 4 | 46 |
| 32 | 8 | 17 |
| 33 | 17 | 18 |
| 34 | 18 | 20 |
| 35 | 20 | 24 |
| 36 | 24 | 19 |
| 37 | 6 | 21 |
| 38 | 9 | 26 |
| 39 | 22 | 28 |
| 40 | 25 | 23 |
| 41 | 32 | 27 |

TABLE 9-4a-continued

| | code_block_pattern | |
|---|---|---|
| codeNum | Intra_4x4, Intra_8x8 | Inter |
| 42 | 33 | 29 |
| 43 | 34 | 30 |
| 44 | 36 | 22 |
| 45 | 40 | 25 |
| 46 | 38 | 38 |
| 47 | 41 | 41 |

TABLE 9-4b

| | code_block_pattern | |
|---|---|---|
| codeNum | Intra_4x4, Intra_8x8 | Inter |
| 0 | 15 | 0 |
| 1 | 0 | 1 |
| 2 | 7 | 2 |
| 3 | 11 | 4 |
| 4 | 13 | 8 |
| 5 | 14 | 3 |
| 6 | 3 | 5 |
| 7 | 5 | 10 |
| 8 | 10 | 12 |
| 9 | 12 | 15 |
| 10 | 1 | 7 |
| 11 | 2 | 11 |
| 12 | 4 | 13 |
| 13 | 8 | 14 |
| 14 | 6 | 6 |
| 15 | 9 | 9 |

ChromaArrayType is equal to 0 for monochrome video signals. ChromaArrayType is equal to 1 for 4:2:0 video. ChromaArrayType is equal to 2 for 4:2:2 video. ChromaArrayType is equal to 3 for 4:4:4 video.

Regarding macroblock layer semantics, the following definition is to be used:

transform_size_8x8_flag equal to 1 specifies that for the current macroblock the transform coefficient decoding process and picture construction process prior to deblocking filter process for residual 8x8 blocks shall be invoked for luma samples, and Cb and Cr samples when chroma_format_idc==3 and separate_colour_plane_flag==0. transform_size_8x8_flag equal to 0 specifies that for the current macroblock the transform coefficient decoding process and picture construction process prior to deblocking filter process for residual 4x4 blocks shall be invoked for luma samples, and Cb and Cr samples when chroma_format_idc==3 and separate_colour_plane_flag==0. When transform_size_8x8_flag is not present in the bitstream, it shall be inferred to be equal to 0.

Regarding macroblock prediction semantics, the following definition is to be used:

intra_chroma_pred_mode specifies the type of spatial prediction used for chroma in macroblocks using Intra_4x4 or Intra_16x16 prediction, as shown in Table 7-16. The value of intra_chroma_pred_mode shall be in the range of 0 to 3, inclusive. When chroma_format_idc==3, intra_chroma_pred_mode shall not be present in the bitstream.

Regarding the binarization process for the coded block pattern, the following applies:

The binarization of coded_block_pattern consists of a prefix part and (when present) a suffix part. The prefix part of the binarization is given by the FL binarization of CodedBlock- PatternLuma with cMax=15. When chroma_format_idc is not equal to 0 (monochrome) or not equal to 3 (4:4:4), the suffix part is present and includes the TU binarization of CodedBlockPatternChroma with cMax=2. The relationship between the value of the coded_block_pattern syntax element and the values of CodedBlockPatternLuma and CodedBlockPatternChroma is given as specified in subclause 7.4.5.

TABLE 1 shows the residual block CABAC syntax, as follows:

TABLE 1

| residual_block_cabac( coeffLevel, maxNumCoeff ) { | C | Descriptor |
|---|---|---|
|   if( maxNumCoeff == 64 && (ChromaArrayType == 3 ) ) | | |
|     coded_block_flag = 1 | | |
|   else | | |
|     coded_block_flag | 3\|4 | Ae(v) |
|   if( coded_block_flag) { | | |
|     numCoeff = maxNumCoeff | | |
|     i = 0 | | |
|     do { | | |
|       significant_coeff_flag[ i ] | 3\|4 | Ae(v) |
|       if( significant_coeff_flag[ i ] ) { | | |
|         last_significant_coeff_flag[ i ] | 3\|4 | Ae(v) |
|         if( last_significant_coeff_flag[ i ] ) { | | |
|           numCoeff = i + 1 | | |
|           for( j = numCoeff; j < maxNumCoeff; j++ ) | | |
|             coeffLevel[ j ] = 0 | | |
|         } | | |
|       } | | |
|       i++ | | |
|     } while( i < numCoeff − 1) | | |
|     coeff_abs_level_minus1[ numCoeff − 1 ] | 3\|4 | Ae(v) |
|     coeff_sign_flag[ numCoeff − 1 ] | 3\|4 | Ae(v) |
|     coeffLevel[ numCoeff − 1 ] = | | |
|       ( coeff_abs_level_minus1[ numCoeff − 1 ] + 1 ) * | | |
|       ( 1 − 2 * coeff_sign_flag[ numCoeff − 1 ] ) | | |
|     for( i = numCoeff − 2; i >= 0; i−− ) | | |
|       if( significanf_coeff_flag[ i ] ) { | | |
|         coeff_abs_level_minus1[ i ] | 3\|4 | Ae(v) |
|         coeff_sign_flag[ i ] | 3\|4 | Ae(v) |
|         coeffLevel[ i ] = ( coeff_abs_level_minus1[ i ] + 1) * | | |
|             ( 1 − 2 * coeff_sign_flag[ i ] ) | | |
|       } else | | |
|         coeffLevel[ i ] = 0 | | |
|   } else | | |
|     for( i = 0; i < maxNumCoeff; i++ ) | | |
|       coeffLevel[ i ] = 0 | | |
| } | | |

40

The initialization process for context variables will now be described.

TABLE 2 shows the Association of ctxIdx and syntax elements for each slice type in the initialization process, as follows:

TABLE 2

| | | | Slice type | | | |
|---|---|---|---|---|---|---|
| | Syntax element | Table | SI | I | P, SP | B |
| slice_data( ) | mb_skip_flag | Table 9-13 | | | 11-13 | 24-26 |
| | | Table 9-14 | | | | |
| | mb_field_decoding_flag | Table 9-18 | 70-72 | 70-72 | 70-72 | 70-72 |
| macroblock_layer( ) | mb_type | Table 9-12 | 0-10 | 3-10 | 14-20 | 27-35 |
| | | Table 9-13 | | | | |
| | | Table 9-14 | | | | |
| | transform_size_8x8_flag | Table 9-16 | na | 399-401 | 399-401 | 399-401 |
| | coded_blocK_pattern (luma) | Table 9-18 | 73-76 | 73-76 | 73-76 | 73-76 |
| | coded_block_pattern (chroma) | Table 9-18 | 77-84 | 77-84 | 77-84 | 77-84 |
| | mb_qp_delta | Table 9-17 | 60-63 | 60-63 | 60-63 | 60-63 |
| mb_pred( ) | prev_intra4x4_pred_mode_flag | Table 9-17 | 68 | 68 | 68 | 68 |
| | rem_intra4x4_pred_mode | Table 9-17 | 69 | 69 | 69 | 69 |
| | prev_intra8x8_pred_mode_flag | Table 9-17 | na | 68 | 68 | 68 |
| | rem_intra8x8_pred_mode | Table 9-17 | na | 69 | 69 | 69 |
| | intra_chroma_pred_mode | Table 9-17 | 64-67 | 64-67 | 64-67 | 64-67 |
| mb_pred( ) and | ref_idx_l0 | Table 9-16 | | | 54-59 | 54-59 |
| sub_mb_pred( ) | ref_idx_l1 | Table 9-16 | | | | 54-59 |
| | mvd_l0[ ][ ][ 0 ] | Table 9-15 | | | 40-46 | 40-46 |
| | mvd_l1[ ][ ][ 0 ] | Table 9-15 | | | | 40-46 |

TABLE 2-continued

|  | Syntax element | Table | Slice type | | | |
|---|---|---|---|---|---|---|
|  |  |  | SI | I | P, SP | B |
|  | mvd_l0[ ][ ][ 1 ] | Table 9-15 |  |  | 47-53 | 47-53 |
|  | mvd_l1[ ][ ][ 1 ] | Table 9-15 |  |  |  | 47-53 |
| sub_mb_pred( ) | sub_mb_type | Table 9-13 |  |  | 21-23 | 36-39 |
|  |  | Table 9-14 |  |  |  |  |
| residual_block_cabac( ) | coded_block_flag | Table 9-18 | 85-104 | 85-104 | 85-104 | 85-104 |
|  |  | Table 9-24a | 460-483 | 460-483 | 460-483 | 460-483 |
|  |  | Table 9-24i |  | 1012-1023 | 1012-1023 | 1012-1023 |
|  | significant_coeff_flag[ ] | Table 9-19 | 105-165 | 105-165 | 105-165 | 105-165 |
|  |  | Table 9-22 | 277-337 | 277-337 | 277-337 | 277-337 |
|  |  | Table 9-24 |  | 402-416 | 402-416 | 402-416 |
|  |  | Table 9-24 |  | 436-450 | 436-450 | 436-450 |
|  |  | Table 9-24b |  | 484-571 | 484-571 | 484-571 |
|  |  | Table 9-22f |  | 776-863 | 776-863 | 776-863 |
|  |  | Table 9-24d |  | 660-689 | 660-689 | 660-689 |
|  |  | Table 9-24e |  | 718-747 | 718-747 | 718-747 |
|  | last_significant_coeff_flag[ ] | Table 9-20 | 166-226 | 166-226 | 166-226 | 166-226 |
|  |  | Table 9-23 | 338-398 | 338-398 | 338-398 | 338-398 |
|  |  | Table 9-24 |  | 417-425 | 417-425 | 417-425 |
|  |  | Table 9-24 |  | 451-459 | 451-459 | 451-459 |
|  |  | Table 9-24c |  | 572-659 | 572-659 | 572-659 |
|  |  | Table 9-24g |  | 864-951 | 864-951 | 864-951 |
|  |  | Table 9-24d |  | 690-707 | 690-707 | 690-707 |
|  |  | Table 9-24e |  | 748-765 | 748-765 | 748-765 |
|  | coeff_abs_level_minus1[ ] | Table 9-21 | 227-275 | 227-275 | 227-275 | 227-275 |
|  |  | Table 9-24 |  | 426-435 | 426-435 | 426-435 |
|  |  | Table 9-24h |  | 952-1011 | 952-1011 | 952-1011 |
|  |  | Table 9-24d |  | 708-717 | 708-717 | 708-717 |
|  |  | Table 9-24e |  | 766-775 | 766-775 | 766-775 |

TABLE 3 shows the values of variables m and n for ctsIdx from 1012 to 1023, as follows:

TABLE 3

| | I and SI slices | | Value of cabac_init_idc | | | | | |
|---|---|---|---|---|---|---|---|---|
| | | | 0 | | 1 | | 2 | |
| ctxIdx | m | n | m | n | m | n | m | n |
| 1012 | −3 | 70 | −3 | 74 | −2 | 73 | −5 | 79 |
| 1013 | −8 | 93 | −9 | 92 | −12 | 104 | −11 | 104 |
| 1014 | −10 | 90 | −8 | 87 | −9 | 91 | −11 | 91 |
| 1015 | −30 | 127 | −23 | 126 | −31 | 127 | −30 | 127 |
| 1016 | −3 | 70 | −3 | 74 | −2 | 73 | −5 | 79 |
| 1017 | −8 | 93 | −9 | 92 | −12 | 104 | −11 | 104 |
| 1018 | −10 | 90 | −8 | 87 | −9 | 91 | −11 | 91 |
| 1019 | −30 | 127 | −23 | 126 | −31 | 127 | −30 | 127 |
| 1020 | −3 | 70 | −3 | 74 | −2 | 73 | −5 | 79 |
| 1021 | −8 | 93 | −9 | 92 | −12 | 104 | −11 | 104 |
| 1022 | −10 | 90 | −8 | 87 | −9 | 91 | −11 | 91 |
| 1023 | −30 | 127 | −23 | 126 | −31 | 127 | −30 | 127 |

Regarding the binarization process, the following applies: The possible values of the context index ctxIdx are in the range 0 to 1023, inclusive. The value assigned to ctxIdxOffset specifies the lower value of the range of ctxIdx assigned to the corresponding binarization or binarization part of a syntax element.

TABLE 4 shows the syntax elements and associated types of binarization, maxBinIdxCtx, and ctxIdxOffset, as follows:

TABLE 4

| Syntax element | Type of binarization | maxBinIdxCtx | ctxIdxOffset |
|---|---|---|---|
| mb_type (SI slices only) | prefix and suffix as specified in subclause 9.3.2.5 | prefix: 0 suffix: 6 | prefix: 0 suffix: 3 |
| mb_type (I slices only) | as specified in subclause 9.3.2.5 | 6 | 3 |
| mb_skip_flag (P, SP slices only) | FL, cMax = 1 | 0 | 11 |
| mb_type (P, SP slices only) | prefix and suffix as specified in subclause 9.3.2.5 | prefix: 2 suffix: 5 | prefix: 14 suffix: 17 |
| sub_mb_type (P, SP slices only) | as specified in subclause 9.3.2.5 | 2 | 21 |
| mb_skip_flag (B slices only) | FL, cMax = 1 | 0 | 24 |
| mb_type (B slices only) | prefix and suffix as specified in subclause 9.3.2.5 | prefix: 3 suffix: 5 | prefix: 27 suffix: 32 |

TABLE 4-continued

| Syntax element | Type of binarization | maxBinIdxCtx | ctxIdxOffset |
|---|---|---|---|
| sub_mb_type (B slices only) | as specified in subclause 9.3.2.5 | 3 | 36 |
| mvd_l0[ ][ ][ 0 ], mvd_l1[ ][ ][ 0 ] | prefix and suffix as given by UEG3 with signedValFlag = 1, uCoff = 9 | prefix: 4 suffix: na | prefix: 40 suffix: na (uses DecodeBypass) |
| mvd_l0[ ][ ][ 1 ], mvd_l1[ ][ ][ 1 ] | | prefix: 4 suffix: na | prefix: 47 suffix: na (uses DecodeBypass) |
| ref_idx_l0, ref_idx_l1 | U | 2 | 54 |
| mb_qp_delta | as specified in subclause 9.3.2.7 | 2 | 60 |
| intra_chroma_pred_mode | TU, cMax = 3 | 1 | 64 |
| prev_intra4x4_pred_mode_flag, prev_intra8x8_pred_mode_flag | FL, cMax = 1 | 0 | 68 |
| rem_intra4x4_pred_mode, rem_intra8x8_pred_mode | FL, cMax = 7 | 0 | 69 |
| mb_field_decoding_flag | FL, cMax = 1 | 0 | 70 |
| coded_block_pattern | prefix and suffix as specified in subclause 9.3.2.6 | prefix: 3 suffix: 1 | prefix: 73 suffix: 77 |
| coded_block_flag (ctxBlockCat < 5) | FL, cMax = 1 | 0 | 85 |
| significant_coeff_flag (frame coded blocks with ctxBlockCat < 5) | FL, cMax = 1 | 0 | 105 |
| last_significant_coeff_flag (frame coded blocks with ctxBlockCat < 5) | FL, cMax = 1 | 0 | 166 |
| coeff_abs_level_minus1 (blocks with ctxBlockCat < 5) | prefix and suffix as given by UEG0 with signedValFlag = 0, uCoff = 14 | prefix: 1 suffix: na | prefix: 227 suffix: na, (uses DecodeBypass) |
| coeff_sign_flag | FL, cMax = 1 | 0 | na, (uses DecodeBypass) |
| end_of_slice_flag | FL, cMax = 1 | 0 | 276 |
| significant_coeff_flag (field coded blocks with ctxBlockCat < 5) | FL, cMax = 1 | 0 | 277 |
| last_significant_coeff_flag (field coded blocks with ctxBlockCat < 5) | FL, cMax = 1 | 0 | 338 |
| transform_size_8x8_flag | FL, cMax = 1 | 0 | 399 |
| significant_coeff_flag (frame coded blocks with ctxBlockCat == 5) | FL, cMax = 1 | 0 | 402 |
| last_significant_coeff_flag (frame coded blocks with ctxBlockCat == 5) | FL, cMax = 1 | 0 | 417 |
| coeff_abs_level_minus1 (blocks with ctxBlockCat == 5) | prefix and suffix as given by UEG0 with signedValFlag = 0, uCoff = 14 | prefix: 1 suffix: na | prefix: 426 suffix: na, (uses DecodeBypass) |
| significant_coeff_flag (field coded blocks with ctxBlockCat == 5) | FL, cMax = 1 | 0 | 436 |
| last_significant_coeff_flag (field coded blocks with ctxBlockCat == 5) | FL, cMax = 1 | 0 | 451 |
| coded_block_flag (5 < ctxBlockCat < 9) | FL, cMax = 1 | 0 | 460 |
| coded_block_flag (9 < ctxBlockCat < 13) | FL, cMax = 1 | 0 | 472 |
| coded_block_flag (ctxBlockCat == 5, 9, or 13) | FL, cMax = 1 | 0 | 1012 |
| significant_coeff_flag (frame coded blocks with 5 < ctxBlockCat < 9) | FL, cMax = 1 | 0 | 484 |
| significant_coeff_flag (frame coded blocks with 9 < ctxBlockCat < 13 ) | FL, cMax = 1 | 0 | 528 |
| last_significant_coeff_flag (frame coded blocks with 5 < ctxBlockCat < 9) | FL, cMax = 1 | 0 | 572 |
| last_significant_coeff_flag (frame coded blocks with 9 < ctxBlockCat < 13) | FL, cMax = 1 | 0 | 616 |
| coeff_abs_level_minus1 (blocks with 5 < ctxBlockCat < 9) | prefix and suffix as given by UEG0 with signedValFlag = 0, uCoff = 14 | prefix: 1 suffix: na | prefix: 952 suffix: na, (uses DecodeBypass) |
| coeff_abs_level_minus1 (blocks with 9 < ctxBlockCat < 13) | prefix and suffix as given by UEG0 with signedValFlag = 0, uCoff = 14 | prefix: 1 suffix: na | prefix: 982 suffix: na, (uses DecodeBypass) |
| significant_coeff_flag (field coded blocks with 5 < ctxBlockCat < 9) | FL, cMax = 1 | 0 | 776 |

TABLE 4-continued

| Syntax element | Type of binarization | maxBinIdxCtx | ctxIdxOffset |
|---|---|---|---|
| significant_coeff_flag (field coded blocks with 9 < ctxBlockCat < 13) | FL, cMax = 1 | 0 | 820 |
| last_significant_coeff_flag (field coded blocks with 5 < ctxBlockCat < 9) | FL, cMax = 1 | 0 | 864 |
| last_significant_coeff_flag (field coded blocks with 9 < ctxBlockCat < 13) | FL, cMax = 1 | 0 | 908 |
| significant_coeff_flag (frame coded blocks with ctxBlockCat == 9) | FL, cMax = 1 | 0 | 660 |
| significant_coeff_flag (frame coded blocks with ctxBlockCat == 13) | FL, cMax = 1 | 0 | 718 |
| last_significant_coeff_flag (frame coded blocks with ctxBlockCat == 9) | FL, cMax = 1 | 0 | 690 |
| last_significant_coeff_flag (frame coded blocks with ctxBlockCat == 13) | FL, cMax = 1 | 0 | 748 |
| coeff_abs_level_minus1 (blocks with ctxBlockCat == 9) | prefix and suffix as given by UEG0 with signedValFlag = 0, uCoff = 14 | prefix: 1 suffix: na | prefix: 708 suffix: na, (uses DecodeBypass) |
| coeff_abs_level_minus1 (blocks with ctxBlockCat == 13) | prefix and suffix as given by UEG0 with signedValFlag = 0, uCoff = 14 | prefix: 1 suffix: na | prefix: 766 suffix: na, (uses DecodeBypass) |
| significant_coeff_flag (field coded blocks with ctxBlockCat == 9) | FL, cMax = 1 | 0 | 675 |
| significant_coeff_flag (field coded blocks with ctxBlockCat == 13) | FL, cMax = 1 | 0 | 733 |
| last_significant_coeff_flag (field coded blocks with ctxBlockCat == 9) | FL, cMax = 1 | 0 | 699 |
| last_significant_coeff_flag (field coded blocks with ctxBlockCat == 13) | FL, cMax = 1 | 0 | 757 |

A description will now be given regarding the derivation process for ctxIdx.

TABLE 5 shows the assignment of ctxIdxBlockCatOffset to ctxBlockCat for syntax elements coded_block_flag, significant_coeff_flag, last_significant_coeff_flag, and coeff_abs_level_minus1, as follows:

TABLE 5

| | ctxBlockCat (as specified in Table 9-33) | | | | | | | | | | | | | |
|---|---|---|---|---|---|---|---|---|---|---|---|---|---|---|
| Syntax element | 0 | 1 | 2 | 3 | 4 | 5 | 6 | 7 | 8 | 9 | 10 | 11 | 12 | 13 |
| coded_block_flag | 0 | 4 | 8 | 12 | 16 | 0 | 0 | 4 | 8 | 4 | 0 | 4 | 8 | 8 |
| significant_coeff_flag | 0 | 15 | 29 | 44 | 47 | 0 | 0 | 15 | 29 | 0 | 0 | 15 | 29 | 0 |
| last_significant_coeff_flag | 0 | 15 | 29 | 44 | 47 | 0 | 0 | 15 | 29 | 0 | 0 | 15 | 29 | 0 |
| coeff_abs_level_minus1 | 0 | 10 | 20 | 30 | 39 | 0 | 0 | 10 | 20 | 0 | 0 | 10 | 20 | 0 |

A description will now be given regarding the derivation process of ctxIdxInc for the syntax element coded_block_flag. The input to this process is ctxBlockCat, and any additional input is specified as follows:

If ctxBlockCat is equal to 0, 6, or 10, no additional input;
Otherwise, if ctxBlockCat is equal to 1 or 2, luma4×4BlkIdx;
Otherwise, if ctxBlockCat is equal to 3, the chroma component index iCbCr;
Otherwise, if ctxBlockCat is equal to 4, chroma4×4BlkIdx and the chroma component index iCbCr;
Otherwise, if ctxBlockCat is equal to 5, luma8×8BlkIdx;
Otherwise, if ctxBlockCat is equal to 7 or 8, cb4×4BlkIdx;
Otherwise, if ctxBlockCat is equal to 9, cb8×8BlkIdx;
Otherwise, if ctxBlockCat is equal to 11 or 12, cr4×4BlkIdx;
Otherwise (ctxBlockCat is equal to 13), cr8×8BlkIdx;
The output of this process is ctxIdxInc(ctxBlockCat).
Let the variable transBlockN (with N being either A or B) be derived as follows.

If ctxBlockCat is equal to 0, 6, or 10, the following applies.
The derivation process for neighboring macroblocks specified in subclause 6.4.10.1 is invoked and the output is assigned to mbAddrN (with N being either A or B).
The variable transBlockN is derived as follows.
If mbAddrN is available and the macroblock mbAddrN is coded in Intra_16×16 prediction mode, the following applies.
If ctxBlockCat is equal to 0, the luma DC block of macroblock mbAddrN is assigned to transBlockN
Otherwise, if ctxBlockCat is equal to 6, the Cb DC block of macroblock mbAddrN is assigned to transBlockN Otherwise (ctxBlockCat is equal to 10), the Cr DC block of macroblock mbAddrN is assigned to transBlockN Otherwise, transBlockN is marked as not available.

Otherwise, if ctxBlockCat is equal to 1 or 2, the following applies.

The derivation process for neighboring 4×4 luma blocks specified in subclause 6.4.10.4 is invoked with luma4×4BlkIdx as input and the output is assigned to mbAddrN, luma4×4BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>(luma4×4BlkIdxN>>2)) & 1) is not equal to 0 for the macroblock mbAddrN, and transform_size_8×8_flag is equal to 0 for the macroblock mbAddrN, the 4×4 luma block with index luma4×4BlkIdxN of macroblock mbAddrN is assigned to transBlockN.

Otherwise, if mbAddrN is available, the macroblock mbAddrN does not have mb_type equal to P_Skip or B_Skip, ((CodedBlockPatternLuma>>(luma4×4BlkIdxN>>2)) & 1) is not equal to 0 for the macroblock mbAddrN, and transform_size_8×8_flag is equal to 1 for the macroblock mbAddrN, the 8×8 luma block with index (luma4×4BlkIdxN>>2) of macroblock mbAddrN is assigned to transBlockN.

Otherwise, transBlockN is marked as not available.

Otherwise, if ctxBlockCat is equal to 3, the following applies.

The derivation process for neighboring macroblocks specified in subclause 6.4.10.1 is invoked and the output is assigned to mbAddrN (with N being either A or B).

The variable transBlockN is derived as follows.

If mbAddrN is available, the macroblock mbAddrN does not have mb_type equal to P_Skip, B_Skip, or I_PCM, and CodedBlockPatternChroma is not equal to 0 for the macroblock mbAddrN, the chroma DC block of chroma component iCbCr of macroblock mbAddrN is assigned to transBlockN.

Otherwise, transBlockN is marked as not available.

Otherwise, if ctxBlockCat is equal to 4, the following applies.

The derivation process for neighboring 4×4 chroma blocks specified in subclause 6.4.10.5 is invoked with chroma4×4BlkIdx as input and the output is assigned to mbAddrN, chroma4×4BlkIdxN (with N being either A or B).

The variable transBlockN is derived as follows.

If mbAddrN is available, the macroblock mbAddrN does not have mb_type equal to P_Skip, B_Skip, or I_PCM, and CodedBlockPatternChroma is equal to 2 for the macroblock mbAddrN, the 4×4 chroma block with chroma4×4BlkIdxN of the chroma component iCbCr of macroblock mbAddrN is assigned to transBlockN.

Otherwise, transBlockN is marked as not available.

Otherwise, if ctxBlockCat is equal to 5, the following applies.

The derivation process for neighboring 8×8 luma blocks specified in subclause 6.4.8.2 is invoked with luma8×8BlkIdx as input and the output is assigned to mbAddrN, luma8×8BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>luma8×8BlkIdx) & 1) is not equal to 0 for the macroblock mbAddrN, and transform_size_8×8_flag is equal to 1 for the macroblock mbAddrN, the 8×8 luma block with index luma8×8BlkIdxN of macroblock mbAddrN is assigned to transBlockN.

Otherwise, transBlockN is marked as not available.

Otherwise, if ctxBlockCat is equal to 7 or 8, the following applies.

The derivation process for neighboring 4×4 Cb blocks specified in subclause 6.4.8.4.1 is invoked with cb4×4BlkIdx as input and the output is assigned to mbAddrN, cb4×4BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>(cb4×4BlkIdxN>>2)) & 1) is not equal to 0 for the macroblock mbAddrN, and transform_size_8×8_flag is equal to 0 for the macroblock mbAddrN, the 4×4 Cb block with index cb4×4BlkIdxN of macroblock mbAddrN is assigned to transBlockN.

Otherwise, if mbAddrN is available, the macroblock mbAddrN does not have mb_type equal to P_Skip or B_Skip, ((CodedBlockPatternLuma>>(cb4×4BlkIdxN>>2)) & 1) is not equal to 0 for the macroblock mbAddrN, and transform_size_8×8_flag is equal to 1 for the macroblock mbAddrN, the 8×8 Cb block with index (cb4×4BlkIdxN>>2) of macroblock mbAddrN is assigned to transBlockN.

Otherwise, transBlockN is marked as not available.

Otherwise, if ctxBlockCat is equal to 9, the following applies.

The derivation process for neighboring 8×8 Cb blocks specified in subclause 6.4.8.2.1 is invoked with cb8×8BlkIdx as input and the output is assigned to mbAddrN, cb8×8BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>cb8×8BlkIdx) & 1) is not equal to 0 for the macroblock mbAddrN, and transform_size_8×8_flag is equal to 1 for the macroblock mbAddrN, the 8×8 Cb block with index cb8×8BlkIdxN of macroblock mbAddrN is assigned to transBlockN.

Otherwise, transBlockN is marked as not available.

Otherwise, if ctxBlockCat is equal to 11 or 12, the following applies.

The derivation process for neighboring 4×4 Cr blocks specified in subclause 6.4.8.4.1 is invoked with cr4×4BlkIdx as input and the output is assigned to mbAddrN, cr4×4BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>(cr4×4BlkIdxN>>2)) & 1) is not equal to 0 for the macroblock mbAddrN, and transform_size_8×8_flag is equal to 0 for the macroblock mbAddrN, the 4×4 Cr block with index cr4×4BlkIdxN of macroblock mbAddrN is assigned to transBlockN.

Otherwise, if mbAddrN is available, the macroblock mbAddrN does not have mb_type equal to P_Skip or B_Skip, ((CodedBlockPatternLuma>>(cr4×

4BlkIdxN>>2)) & 1) is not equal to 0 for the macroblock mbAddrN, and transform_size_8x8_flag is equal to 1 for the macroblock mbAddrN, the 8×8 Cr block with index (cr4×4BlkIdxN>>2) of macroblock mbAddrN is assigned to transBlockN.

Otherwise, transBlockN is marked as not available.

Otherwise (ctxBlockCat is equal to 13), the following applies.

The derivation process for neighboring 8×8 Cr blocks specified in subclause 6.4.8.2.1 is invoked with cr8×8BlkIdx as input and the output is assigned to mbAddrN, cr8×8BlkIdxN (with N being either A or B).

The variable transBlockN is derived as follows.

If mbAddrN is available, the macroblock mbAddrN does not have mb_type equal to P_Skip, B_Skip, or I_PCM, ((CodedBlockPatternLuma>>cr8×8BlkIdx) & 1) is not equal to 0 for the macroblock mbAddrN, and transform_size_8x8_flag is equal to 1 for the macroblock mbAddrN, the 8×8 Cr block with index cr8×8BlkIdxN of macroblock mbAddrN is assigned to transBlockN.

Otherwise, transBlockN is marked as not available.

Let the variable condTermFlagN (with N being either A or B) be derived as follows:

If any of the following conditions is true, condTermFlagN is set equal to 0 mbAddrN is not available and the current macroblock is coded in Inter prediction mode mbAddrN is available and transBlockN is not available and mb_type for the macroblock mbAddrN is not equal to I_PCM The current macroblock is coded in Intra prediction mode, constrained_intra_pred_flag is equal to 1, the macroblock mbAddrN is available and coded in Inter prediction mode, and slice data partitioning is in use (nal_unit_type is in the range of 2 through 4, inclusive).

Otherwise, if any of the following conditions is true, condTermFlagN is set equal to 1 mbAddrN is not available and the current macroblock is coded in Intra prediction mode mb_type for the macroblock mbAddrN is equal to I_PCM Otherwise, condTermFlagN is set equal to the value of the coded_block_flag of the transform block transBlockN that was decoded for the macroblock mbAddrN.

The variable ctxIdxInc(ctxBlockCat) is derived by the following:

$$ctxIdxInc(ctxBlockCat)=condTermFlagA+2*condTermFlagB \quad (9)$$

Turning to FIG. 3, an exemplary video encoding process is indicated generally by the reference numeral 300.

The encoding process 300 includes a start block 305 that passes control to a loop limit block 312. The loop limit block 312 begins a loop for each block in the image, and passes control to a function block 315. The function block 315 forms a motion compensated or spatial prediction of the current image block, and passes control to a function block 320. The function block 320 subtracts the motion compensated or spatial prediction from the current image block to form a prediction residual, and passes control to a function block 330. The function block 330 transforms and quantizes the prediction residual, and passes control to a function block 335. The function block 335 inverse transforms and quantizes the prediction residual to form a coded prediction residual, and passes control to a function block 345. The function block 345 adds the coded residual to the prediction to form a coded picture block, and passes control to an end loop block 350. The end loop block 350 ends the loop and passes control to a function block 355. The function block 355 sends a syntax element, in-band or out-of-band with respect to a resultant bitstream encoded for at least the image, to indicate the presence of 8×8 blocks, when applicable (i.e., when such blocks are, in fact, present in the bitstream), and passes control to an end block 399. The syntax element may be sent, for example, to permit selective disabling of the application of CABAC and/or CAVLC to the indicated blocks by a decoder.

Turning to FIG. 4, an exemplary video decoding process is indicated generally by the reference numeral 400.

The decoding process 400 includes a start block 405 that passes control to a function block 407. The function block 407 receives a syntax element, in-band or out-of-band with respect to the bitstream, that indicates the presence of 8×8 blocks, when applicable (i.e., when such blocks are, in fact, present in the bitstream), and passes control to a loop limit block 410. The syntax element may be received, for example, to permit selective disabling of the application of CABAC and/or CAVLC to the indicated blocks during decoding. The loop limit block 410 begins a loop for a current block in an image from a bitstream, and passes control to a function block 415. The function block 415 entropy decodes the coded residual, and passes control to a function block 420. The function block 420 inverse transforms and quantizes the decoded residual to form a coded residual, and passes control to a function block 430. The function block 430 adds the coded residual to the prediction to form a coded picture block, and passes control to a loop limit block 435. The loop limit block 435 ends the loop and passes control to an end block 499.

Figure 5:
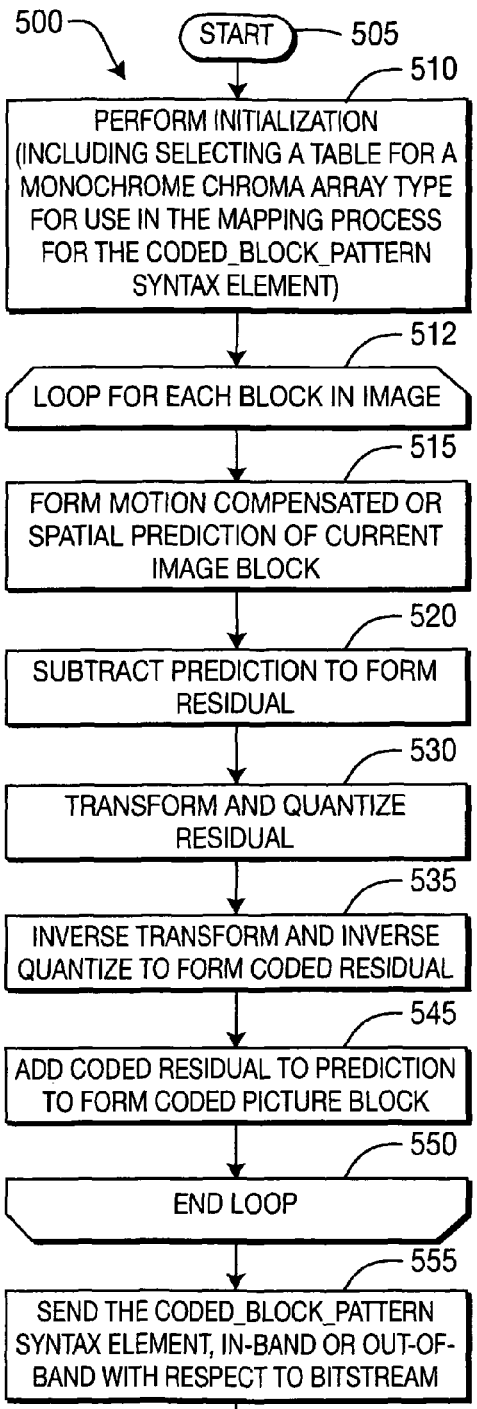
FIG. 5 is a flow diagram illustrating another exemplary video encoding process, in accordance with an embodiment of the present principles.

Turning to FIG. 5, an exemplary video encoding process is indicated generally by the reference numeral 500.

The encoding process 500 includes a start block 505 that passes control to a function block 510. The function block 510 performs an initialization, including selecting a table for a monochrome chroma array type for use in the mapping process for the coded_block_pattern syntax element, and passes control to a loop limit block 512. The loop limit block 512 begins a loop for each block in the image, and passes control to a function block 515. The function block 515 forms a motion compensated or spatial prediction of the current image block, and passes control to a function block 520. The function block 520 subtracts the motion compensated or spatial prediction from the current image block to form a prediction residual, and passes control to a function block 530. The function block 530 transforms and quantizes the prediction residual, and passes control to a function block 535. The function block 535 inverse transforms and quantizes the prediction residual to form a coded prediction residual, and passes control to a function block 545. The function block 545 adds the coded residual to the prediction to form a coded picture block, and passes control to an end loop block 550. The end loop block 550 ends the loop and passes control to a function block 555. The function block 555 sends the coded_block_pattern syntax element, in-band or out-of-band with respect to a resultant bitstream encoded for at least the image, and passes control to an end block 599.

Figure 6:
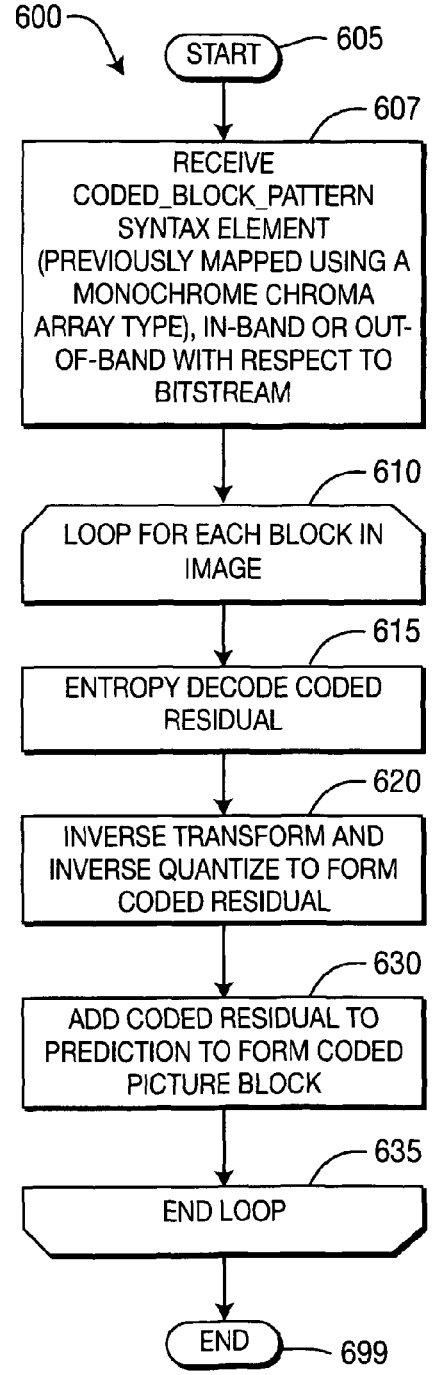
FIG. 6 is a flow diagram illustrating another exemplary video decoding process, in accordance with an embodiment of the present principles.

Turning to FIG. 6, an exemplary video decoding process is indicated generally by the reference numeral 600.

The decoding process 600 includes a start block 605 that passes control to a function block 607. The function block 607 receives the coded_block_pattern syntax element (previously mapped using a monochrome chroma array type), in-band or out-of-band with respect to the bitstream, and passes control to a loop limit block 610. The loop limit block 610 begins a loop for a current block in an image from a bitstream, and passes control to a function block 615. The function block 615 entropy decodes the coded residual, and passes control to a function block 620. The function block 620 inverse transforms and quantizes the decoded residual to form a coded residual, and passes control to a function block 630. The function block 630 adds the coded residual to the prediction to form a coded picture block, and passes control to a loop limit block 635. The loop limit block 635 ends the loop and passes control to an end block 699.

For the sake of brevity and clarity, it is to be appreciated that FIGS. 3-6 may not show all steps involved in respectively encoding and decoding image blocks.

A description will now be given of some of the many attendant advantages/features of the present invention, some of which have been mentioned above. For example, one advantage/feature is an apparatus that includes an encoder for encoding image data into a resultant bitstream in accordance with an encoding profile that encodes a sample of the image data such that the sample includes two chrominance arrays and a luminance array. Each of the two chrominance arrays has a same height and a same width as the luminance array. The encoder indicates a presence of at least one 8×8 block in the resultant bitstream using a syntax element.

Another advantage/feature is the apparatus having the encoder as described above, wherein the syntax element indicates the presence of the at least one 8×8 block with respect to Context Adaptive Binary Arithmetic Coding (CABAC).

Yet another advantage/feature is the apparatus having the encoder as described above, wherein the syntax element indicates the presence of the at least one 8×8 block to permit selectively disabling an application of the Context Adaptive Binary Arithmetic Coding (CABAC) to the at least one 8×8 block by a decoder.

Still another advantage/feature is the apparatus having the encoder as described above, wherein the encoding profile is a High 4:4:4 profile of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

Moreover, another advantage/feature is the apparatus having the encoder as described above, wherein the encoding profile is any of a High 4:4:4 Intra profile, a CAVLC 4:4:4 Intra profile, and a High 4:4:4 Predictive profile.

Further, another advantage/feature is the apparatus having the encoder as described above, wherein the syntax element is previously unused.

Also, another advantage/feature is the apparatus having the encoder as described above, wherein the syntax element is a high level syntax element.

Additionally, another advantage/feature is the apparatus having the encoder as described above, wherein the high level syntax element is placed at at least one of a slice header level, a Supplemental Enhancement Information (SEI) level, a picture parameter set level, a sequence parameter set level and a network abstraction layer unit header level.

Moreover, another advantage/feature is the apparatus having the encoder as described above, wherein the syntax element is sent one of in-band and out-of-band with respect to the resultant bitstream.

Further, another advantage/feature is an apparatus having an encoder for encoding image data into a resultant bitstream in accordance with an encoding profile that encodes a sample of the image data such that the sample includes two chrominance arrays and a luminance array. Each of the two chrominance arrays has a same height and a same width as the luminance array. The encoder encodes the image data using Context Adaptive Variable Length Coding (CAVLC) and performs a mapping process for a coded block pattern syntax element using a monochrome chroma array type.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   an encoder for encoding image data into a resultant bitstream in accordance with an encoding profile that encodes a sample of the image data such that the sample includes two chrominance arrays and a luminance array, each of the two chrominance arrays having a same height and a same width as the luminance array,
   wherein said encoder indicates a presence of non-zero transform coefficients for at least one 8×8 block in the resultant bitstream using a first syntax element, and indicates a presence of non-zero transform coefficients for each of the two chrominance arrays and the luminance array of the at least one 8×8 block in the resultant bitstream using a second syntax element, and
   wherein said encoder encodes the image data into the resultant bitstream in accordance with the encoding profile by performing a mapping process for a coded block pattern syntax element using a monochrome chroma array type;

wherein the first syntax element indicates the presence of the at least one 8×8 block to permit selectively disabling an application of the Context Adaptive Binary Arithmetic Coding (CABAC) to the at least one 8×8 block by a decoder.

2. The apparatus of claim 1, wherein the encoding profile is a High 4:4:4 profile of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

3. The apparatus of claim 2, wherein the encoding profile is any of a High 4:4:4 Intra profile and a High 4:4:4 Predictive profile.

4. The apparatus of claim 1, wherein the second syntax element is previously unused in the International Organization for Standardization/International Electrotechnical Commission Moving Picture Experts Group-4 Part 10 Advanced Video Coding standard/International Telecommunication Union, Telecommunication Sector H.264 recommendation.

5. The apparatus of claim 1, wherein the first syntax element is coded_block_pattern, and the second syntax element is coded_block_flag.

6. A method, comprising:
encoding image data into a resultant bitstream in accordance with an encoding profile that encodes a sample of the image data such that the sample includes two chrominance arrays and a luminance array, each of the two chrominance arrays having a same height and a same width as the luminance array;
wherein said encoding step comprises indicating a presence of non-zero transform coefficients for at least one 8×8 block in the resultant bitstream using a first syntax element, and indicating a presence of non-zero transform coefficients for each of the two chrominance arrays and the luminance array of the at least one 8×8 block in the resultant bitstream using a second syntax element, and
wherein said encoding step encodes the image data into the resultant bitstream in accordance with the encoding profile by performing a mapping process for a coded block pattern syntax element using a monochrome chroma array type;
wherein the first syntax element indicates the presence of the at least one 8×8 block to permit selectively disabling an application of the Context Adaptive Binary Arithmetic Coding (CABAC) to the at least one 8×8 block by a decoder.

7. The method of claim 6, wherein the encoding profile is a High 4:4:4 profile of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

8. The method of claim 7, wherein the encoding profile is any of a High 4:4:4 Intra profile and a High 4:4:4 Predictive profile.

9. The method of claim 6, wherein the second syntax element is previously unused in the International Organization for Standardization/International Electrotechnical Commission Moving Picture Experts Group-4 Part 10 Advanced Video Coding standard/International Telecommunication Union, Telecommunication Sector H.264 recommendation.

10. The method of claim 6, wherein the first syntax element is coded_block_pattern, and the second syntax element is coded_block_flag.

11. An apparatus, comprising:
a decoder for decoding image data from a bitstream previously encoded in accordance with an encoding profile that encodes a sample of the image data such that the sample includes two chrominance arrays and a luminance array, each of the two chrominance arrays having a same height and a same width as the luminance array,
wherein said decoder determines a presence of non-zero transform coefficients for at least one 8×8 block in the resultant bitstream using a first syntax element, and determines a presence of non-zero transform coefficients for each of the two chrominance arrays and the luminance array of the at least one 8×8 block in the resultant bitstream using a second syntax element, and
wherein said decoder decodes the image data from the bitstream previously encoded in accordance with the encoding profile by performing a mapping process for a coded block pattern syntax element using a monochrome chroma array type;
wherein the first syntax element indicates the presence of the at least one 8×8 block to permit selectively disabling an application of the Context Adaptive Binary Arithmetic Coding (CABAC) to the at least one 8×8 block by the decoder.

12. The apparatus of claim 11, wherein the encoding profile is a High 4:4:4 profile of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

13. The apparatus of claim 12, wherein the encoding profile is any of a High 4:4:4 Intra profile and a High 4:4:4 Predictive profile.

14. The apparatus of claim 11, wherein the second syntax element is previously unused in the International Organization for Standardization/International Electrotechnical Commission Moving Picture Experts Group-4 Part 10 Advanced Video Coding standard/International Telecommunication Union, Telecommunication Sector H.264 recommendation.

15. The apparatus of claim 11, wherein the first syntax element is coded_block_pattern and the second syntax element is coded_block_flag.

16. A method, comprising:
decoding image data from a bitstream previously encoded in accordance with an encoding profile that encodes a sample of the image data such that the sample includes two chrominance arrays and a luminance array, each of the two chrominance arrays having a same height and a same width as the luminance array,
wherein said decoding step comprises determining a presence of non-zero transform coefficients for at least one 8×8 block in the resultant bitstream using a first syntax element, and determining a presence of non-zero transform coefficients for each of the two chrominance arrays and the luminance array of the at least one 8×8 block in the resultant bitstream using a second syntax element and
wherein said decoding step decodes the image data from the bitstream previously encoded in accordance with the encoding profile by performing a mapping process for a coded block pattern syntax element using a monochrome chroma array type;

wherein the first syntax element indicates the presence of the at least one 8×8 block to permit selectively disabling an application of the Context Adaptive Binary Arithmetic Coding (CABAC) to the at least one 8×8 block by the decoder.

17. The method of claim 16, wherein the encoding profile is a High 4:4:4 profile of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

18. The method of claim 17, wherein the encoding profile is any of a High 4:4:4 Intra profile and a High 4:4:4 Predictive profile.

19. The method of claim 16, wherein the second syntax element is previously unused in the International Organization for Standardization/International Electrotechnical Commission Moving Picture Experts Group-4 Part 10 Advanced Video Coding standard/International Telecommunication Union, Telecommunication Sector H.264 recommendation.

20. The method of claim 16, wherein the first syntax element is coded_block_pattern, and the second syntax element is coded_block_flag.

21. A non-transitory computer readable storage media having video signal data encoded thereupon, comprising:
 image data encoded into a resultant bitstream in accordance with an encoding profile that encodes a sample of the image data such that the sample includes two chrominance arrays and a luminance array, each of the two chrominance arrays having a same height and a same width as the luminance array,
 wherein a presence of non-zero transform coefficients for at least one 8×8 block in the resultant bitstream is indicated using a first syntax element, and a presence of non-zero transform coefficients for each of the two chrominance arrays and the luminance array of the at least one 8×8 block in the resultant bitstream is indicated using a second syntax element, and
 wherein the image data is encoded into the resultant bitstream in accordance with the encoding profile by performing a mapping process for a coded block pattern syntax element using a monochrome chroma array type;
 wherein the first syntax element indicates the presence of the at least one 8×8 block to permit selectively disabling an application of the Context Adaptive Binary Arithmetic Coding (CABAC) to the at least one 8×8 block by a decoder.

* * * * *

UNITED STATES PATENT AND TRADEMARK OFFICE
CERTIFICATE OF CORRECTION

PATENT NO.        : 8,787,457 B2
APPLICATION NO.   : 12/448868
DATED             : July 22, 2014
INVENTOR(S)       : Haoping Yu It is certified that error appears in the above-identified patent and that said Letters Patent is hereby corrected as shown below:

In The Specification

Column 10, TABLE I, line 2, change "ChromaArrayType = = 3" to --- ChromaArrayType != 3 ---.

Signed and Sealed this
First Day of March, 2016

Michelle K. Lee
*Director of the United States Patent and Trademark Office*